(12) United States Patent
Elnozahy

(10) Patent No.: US 6,421,701 B1
(45) Date of Patent: Jul. 16, 2002

(54) METHOD AND SYSTEM FOR REPLICATION SUPPORT IN A REMOTE METHOD INVOCATION SYSTEM

(75) Inventor: Elmootazbellah Nabil Elnozahy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/239,257

(22) Filed: Jan. 29, 1999

(51) Int. Cl.[7] .............................................. G06F 9/00
(52) U.S. Cl. ...................... 709/100; 709/201; 709/203; 709/205; 712/245
(58) Field of Search ................................ 709/100, 102, 709/103, 104, 200, 201, 202, 203, 205, 219, 224; 712/245; 714/47

(56) References Cited

U.S. PATENT DOCUMENTS

| | | | | |
|---|---|---|---|---|
| 4,534,024 A | * | 8/1985 | Maxemchuk et al. | 370/445 |
| 5,408,619 A | * | 4/1995 | Oran | 707/10 |
| 5,513,314 A | * | 4/1996 | Kandasamy et al. | 714/6 |
| 5,603,026 A | * | 2/1997 | Demers et al. | 707/8 |
| 5,671,407 A | * | 9/1997 | Demers et al. | 707/8 |
| 5,699,501 A | * | 12/1997 | Badovinatz et al. | 714/4 |
| 5,713,017 A | * | 1/1998 | Lin et al. | 707/8 |
| 5,852,724 A | * | 12/1998 | Glenn, II et al. | 709/239 |
| 6,052,712 A | * | 4/2000 | Badovinatz et al. | 709/205 |

* cited by examiner

Primary Examiner—Majid A. Banankhah
(74) Attorney, Agent, or Firm—Casimer K. Salys; Bracewell & Patterson, L.L.P.

(57) ABSTRACT

A method and system are disclosed for enforcing consistency among replicas of a server through the reliable and ordered delivery of client requests via an ordering multicast protocol in association with a deterministic and pre-emptive scheduler in a computer network having at least one client connected to a replicated server. The scheduler enforces an execution order that conforms with the request ordering specified by the multicast protocol. The deterministic scheduler subdivides execution streams into instruction slices such that the number of instructions within each slice is pre-determined. An instruction counter is used to generate an interrupt at the expiration of an instruction slice. A thread is scheduled at the beginning of an instruction slice, such that all scheduling decisions are identical among all server replicas. Therefore, all scheduling decisions are identical everywhere, eliminating the nondeterminism due to time-based scheduling of traditional thread schedulers. The deterministic scheduler also accepts new client requests and creates a thread for every m instruction slices using call admission control windows by waiting for a new multicast request. The new multicast may contain no new requests, in which case the scheduler continues scheduling the existing threads. Otherwise, the thread scheduler admits the new requests and creates new threads to execute them in the order specified by the multicast protocol.

20 Claims, 3 Drawing Sheets

METHOD AND SYSTEM FOR REPLICATION SUPPORT IN A REMOTE METHOD INVOCATION SYSTEM

RELATED APPLICATIONS

The present application Ser. No. 09/184,245 is related to a co-pending application entitled "DETERMINISTIC AND PREEMPTIVE THREAD SCHEDULING AND ITS USE IN DEBUGGING MULTITHREADED APPLICATIONS", filed Nov. 2, 1998 with the application assigned to the assignee of the present application.

BACKGROUND OF THE INVENTION

1. Field of the Invention

The present invention generally relates to computer and information handling systems, and more particularly to replicated servers deployed in a distributed system. Still more particularly, the present invention relates to a method and system for enforcing consistency among replicated servers in a distributed system through the use of multicast and deterministic thread scheduling.

2. Description of the Related Art

Computer networks allow users of data-processing systems to retrieve vast amounts of electronic information heretofore unavailable in an electronic medium. Computer networks are increasingly displacing more conventional means of information transmission, such as newspapers, magazines, and television. A computer network connects a set of machines and allows them to communicate with one another. Typical networked systems utilized widely today follow the client/server architecture. In network computing, a client is a process (roughly a program or task) that requests a service provided by another program, the server. The client process may utilize the requested service without having to "know" the working details of the server's operation or the requested service itself.

It is common nowadays to use remote procedure call (RPC) in implementing servers in a network-computing environment. Furthermore, remote procedure calls are often referred to as remote method invocation systems when the client and servers use an object-oriented paradigm for software implementation and communications. We shall use the terms remote procedure calls and remote method invocations interchangeably. In this model of execution, clients formulate their requests in the form of "procedure calls" or "method invocations" that execute on the server machine. The server implements the required procedure calls and methods. During normal operation, it waits to receive requests from its clients across the network. When the network subsystem delivers such a request to the server, the latter creates a "thread" to execute the client's request and generates an appropriate reply. A thread is a lightweight execution unit that lives in the server process's address space and shares its resources with potentially other threads that are executing other, possibly independent client requests. In this model, the thread starts executing at the procedure call specified by the client's request, and executes until the procedure call returns. The server then sends the value produced by the procedure call back to the client and deallocates the thread. This RPC model of execution has become the centerpiece of distributed computing standards such as the Distributed Computing Environment (DCE), the Common Object Request Broker Architecture (CORBA), and DCOM (Distributed Common Object Model).

Server architectures are often configured to achieve reliability and high availability utilizing replication. In such systems, several processors or machines may be utilized to provide a service, with each machine replicating the service's state. Such machines are referred to as "server replicas" or simply "replicas". A client may communicate with a subset of the server replicas, where such a subset may include all, some, or only one of the available replicas. A client may select the subset randomly or via pre-defined selection criteria. It is thus necessary that all server replicas maintain identical states in order to ensure a consistent view of the information manipulated by the service, as perceived by the same client or by different clients.

Each replica has its own private implementation of the remote procedures that constitute the service. Execution of a client's request proceeds independently among the different servers and it is important to ensure that the states of the replicas remain consistent despite this independent form of execution. If a server replica fails, the remaining server replicas continue to operate, thereby ensuring uninterrupted service for the clients.

A problem faced by designers in implementing replicated services is to ensure that replicas maintain identical states that reflect client transactions with the service. For example, two different clients may issue two remote procedure calls to update the same record in a database maintained by a replicated service. If the two procedure calls are processed in different orders by two or more replicas, the values of the replicated record may become inconsistent.

There are two properties of RPC systems that may lead two different client requests to execute in two different orders at different server replicas:

First, the network may deliver requests to the server replicas in different orders. For example, if clients A and B send RPC's R and P to server replicas C and D, the thread executing RPC R at server C may start before the thread executing RPC P, if the network delivers R before P at C. Similarly, the thread executing RPC P at server D may start before the thread executing RPC R, if the network delivers P before R at D. Thus, if the network does not deliver the clients' requests in the same order at server replicas C and D, they will execute the requests in different orders and may become inconsistent.

Secondly, the thread scheduler inside each server may schedule the threads that are executing clients' requests in different orders. Conventional thread schedulers use timers to enable scheduling decisions, and since timers cannot be precise across different machines for pedagogical reasons, thread scheduling decisions will not be identical among different server replicas. Thus, even if the network delivers client requests in the same order among all replicas, the thread scheduling may not necessarily obey that order and the executions of the client requests on two different server replicas may thus be different.

All existing distributed computing standards are susceptible to the problem described above. In the past, ordered multicast protocols have attempted to address this problem. They ensure that all server replicas receive the same messages from the network in the same order. Then, execution within each server replica is serialized according to the order specified by the network, such that a request cannot start execution before the previous one finishes. This solution is not satisfactory because it eliminates the benefits of concurrency available within each server and reduces performance drastically. As a result, the resulting performance loss due to replication is large. Furthermore, in the prior art, there was never a coupling between the order specified by the multicast protocol and the execution order of the threads that execute the request. Based on the foregoing, it can be appreciated that a need exists for an improved method and system for implementing an ordering protocol in combination with a thread scheduling mechanism that ensures all replicas of server receive and execute clients' requests in the same order. The subject invention herein solves all of these problems in a new and unique manner that has not been part of the art previously.

SUMMARY OF THE INVENTION

It is therefore an object of the invention to provide an improved method and system for maintaining the consistency among replicated servers in computer networks.

It is another object of the invention to provide an improved method and system for maintaining the consistency among replicated servers in computer networks where clients and servers communicate via remote procedure calls.

It is yet another object of the invention to provide an improved method and system for maintaining the consistency among replicated servers in computer networks where clients and servers communicate via remote procedure calls, and where servers use multiple threads to execute multiple client requests in parallel and improve performance.

The above and other objects are achieved as is now described. A method and system is disclosed for maintaining consistency among the replicas of a server in a computer network, where clients and servers use remote procedure calls (RPC's) for communications, and where servers use multiple threads to execute client requests. The computer network is assumed to connect one or more clients to a replicated server. Each server replica among the group of servers replicates a particular network service to ensure that the particular network service remains uninterrupted in the event of a server failure. A client's request is formulated in a remote procedure call according to established art. Each server replica implements the desired service in the form of procedure calls or object methods, as is common in the art.

We assume the existence of an ordering multicast protocol that delivers clients' requests (the RPC's) reliably in the same order to all server replicas. Many such protocols have been proposed and implemented, and the current invention can be easily adapted to work with any protocol as follows. The multicast protocol delivers client requests to server replicas in rounds. During a round, each server replica receives the same set of client requests with an associated execution order that has been decided by the multicast protocol. The order by which the multicast protocol delivers the requests will be enforced among all service replicas. As common in the art, a multicast round can be empty, delivering no requests. Such empty rounds have been used traditionally to support failure detection and ensure execution progress.

In association with the multicast protocol a deterministic and pre-emptive thread scheduler based on instruction counters is utilized. The deterministic scheduler subdivides execution streams into instruction slices such that the number of instructions within each slice is pre-determined. All replicas switch threads according to a known algorithm (e.g. round robin) wherein the scheduling occurs at the end of each instruction slice. That is, every thread runs until the number of instructions within a slice expires or the thread voluntarily blocks. Therefore, all scheduling decisions are identical everywhere, eliminating nondeterminism due to time-based scheduling of traditional thread schedulers.

Furthermore, the deterministic scheduler incorporates new threads into the ready queue only during what is termed herein the admission control window (ACW). According to this scheme, the scheduler admits new threads only every m instruction slices, where m is a tunable implementation parameter that regulates the frequency of ACW's. It can be seen that thread executions among all service replicas will remain identical. Threads are admitted during the same ACW's at all replicas, and are scheduled to execute the same number of instructions between context switches. The result is an execution that will have the same output at all replicas.

The occurrence of each ACW is coupled with the arrival of a multicast round. That is, there is a one-to-one correspondence between multicast rounds and the ACW's. The new requests that arrive in a multicast round are admitted into the scheduler's ready queue. If the round is empty, the scheduler continues scheduling the existing threads.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
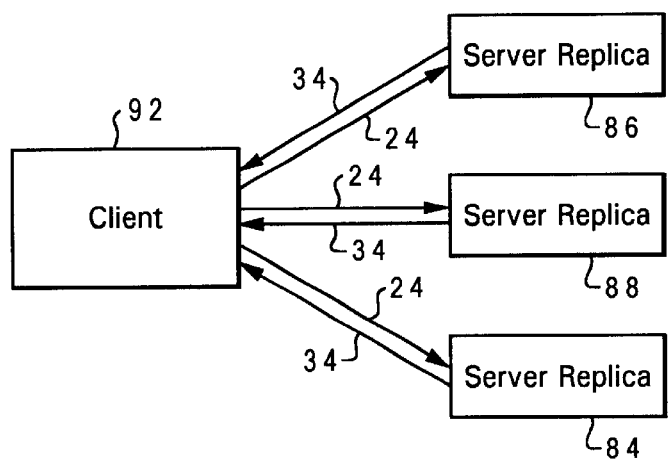
FIG. 1 depicts a block diagram illustrative of interactions between a client and replicated servers, in accordance with a preferred embodiment of the present invention.

With reference now to the figures and in particular with reference to FIG. 1, there is depicted a detailed block diagram illustrating a client/replicated server architecture which may be implemented in accordance with a preferred embodiment of the present invention. The client and servers depicted in FIG. 1 represent processes that may be generated from a high-level programming language (e.g., C++), which is interpreted and executed in a computer system at run-time (e.g., a workstation).

In the client/replicated architecture depicted in FIG. 1, client 92 is connected to a remote service via a computer network. The remote service executes applications at one or more different server replicas 84, 86, and 88 to reduce the likelihood of service unavailability due to process, machine or communication failures. Such replicas are identical and run the same software required to implement a particular service program. Client 92 can send remote procedure calls to any or all among replicas 84, 86, and 88. In particular, FIG. 1 depicts a situation, in which a client may direct its remote procedure call 24 to replicas 84, 86 and replica 88. The program service executes the RPC at each server replica and generates a result 34 that is communicated back to the client. The client can receive the result from all the replicas, although it is preferred to filter these so that only one result reaches the client (all results are identical).

Figure 2:
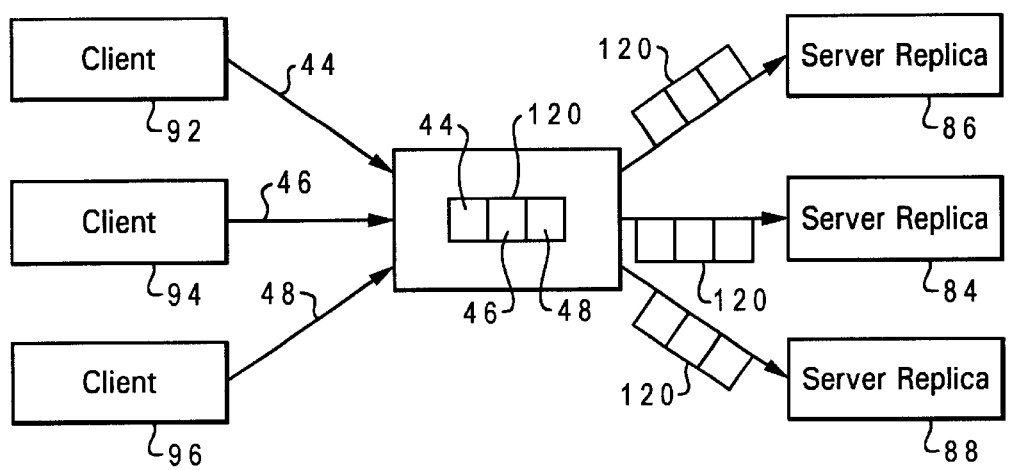
FIG. 2 is a block diagram illustrative of the operation of a multicast protocol to order clients' remote procedure calls, in accordance with a preferred embodiment of the present invention.

With reference now to FIG. 2, there is depicted the operation of a multicast protocol as required by the current invention. The multicast protocol orders the remote procedure calls 44, 46 and 48 issued by clients 92, 94 and 96, and groups them in a multicast round 120. The round 120 is delivered reliably to all service replicas 84, 86 and 88, and therefore all replicas agree on the order in which clients' remote procedure calls should be executed. Thus, during a multicast round, each server replica receives the same set of remote procedure calls to execute in a specified order.

Figure 3:
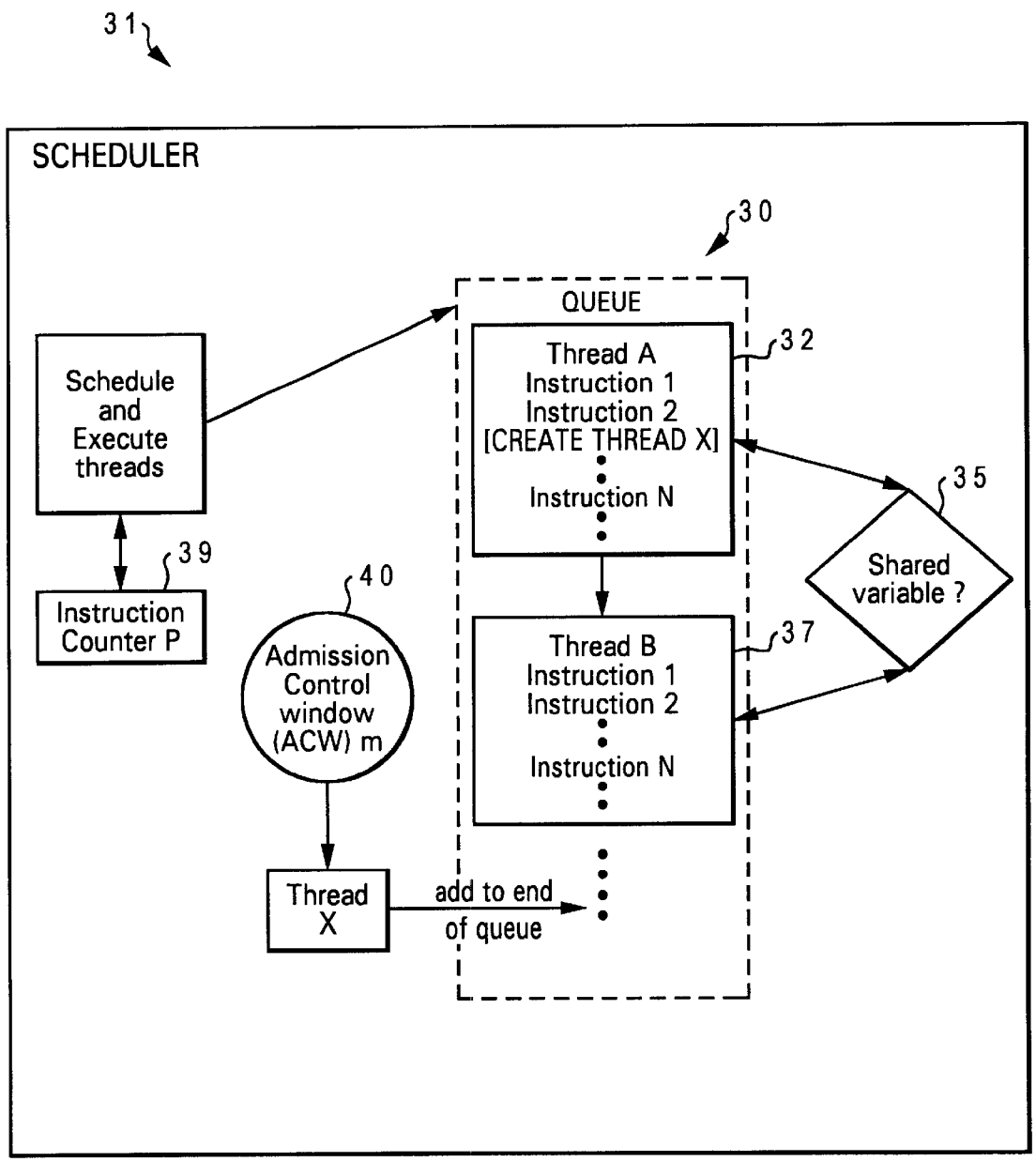
FIG. 3 is a block diagram depicting one implementation of an instruction sliced multithread scheduler in accordance with the present invention.

With reference now to FIG. 3, there is depicted one embodiment of a deterministic thread scheduler 31. Each server implements a copy of this scheduler. Scheduler 31 includes the traditional data structures required to support the scheduling mechanism as is commonly implemented in the art. These include a run (or ready) queue 30. Main memory of the data processing system contains data structures along with the code for implementing scheduler 31. All data structures are initialized in an identical manner across all replicas. Additionally, and unlike existing art, scheduler 31 includes an instruction counter 39 which is a register that counts down by one each time a thread executes one instruction on the CPU of each replicated server. The instruction counter serves to implement instruction slices, each consisting of a fixed number of instructions. Instruction counter 39 is given a chosen value, p, prior to the beginning of an instruction slice. When instruction counter 39 reaches zero, it generates an interrupt that activates the scheduler. This instruction counter 39 could be available in hardware in the form of a CPU register within a replicated server, or it can be emulated in software. The invention described herein works with either variety. Moreover, the scheduler's design departs from prior art in that it does not rely on timers.

The present invention implements deterministic and pre-emptive thread scheduling. Scheduler 31 allocates instruction slices on a CPU, where an instruction slice serves as a scheduling unit during which a thread executes a pre-specified number of instructions, p, before it is pre-empted. Thus, for the purposes of the present disclosure, scheduling by "instruction slice" means scheduling a thread based upon a number of instructions executed and not based upon a time of execution or number of execution cycles. The instruction slice is implemented with the help of instruction counter 39. At the beginning of a slice, instruction counter 39 is set to p. As the thread executes within the instruction slice, the counter decrements by one for each instruction executed. When the instruction counter reaches zero, an interrupt forces the thread to be pre-empted and scheduler 31 takes over. Scheduler 31 performs the necessary context switching and possibly brings in another thread to run, or decides to allow the existing thread to continue running. In either case, a new instruction slice begins by setting instruction counter 39 to p as already described.

Referring once again to FIG. 3, the state of a thread A 32 in queue 30 is uniquely determined by the initial state at the time it started, the stream of instructions that it has executed, and the input it has received. If the thread is given the same initial state, runs a given number of instruction and receives the same input during this run, the state of the thread will always be the same after executing the number of instructions in any different runs. In the prior art, nondeterminism occurred when the thread was pre-empted at some random location (e.g. as a result of timer expirations). The pre-emption may allow another thread B 37 to modify a shared variable 35 that thread A 32 will read later. Because the pre-emption orders the executions of threads A 32 and B 37, thread A 32 may read different values in two different runs, depending on whether thread B 37 gets to modify the shared variable 35 before or after thread A 32 reads it. This is uniquely determined by the pre-emption locations, which are not repeatable across the server replicas because of the imprecise nature of computer timers and their independence from the execution of the CPU.

In the present invention, pre-emption occurs at the expiration of an instruction slice. Therefore, pre-emptions will occur at the same locations during any run of the program at any server replica. Since pre-emptions are the source of nondeterminism that affect the outcome of the program, forcing them to occur at the same location within any program run at any server replica will force the program to yield the same results if it receives the same inputs. Consider the example above. If thread B 37 modifies the variable during its second instruction slice, while thread A 32 reads the variable during its third instruction slice, and assuming round robin scheduling, then it follows that thread A 32 will always read the shared variable 35 after thread B 37 modifies it. The outcome is thus deterministic across all the server replicas if the same value p is utilized to control the instruction slices.

Scheduler 31 also pre-empts a thread when it decides to relinquish the CPU before its instruction slice expires. This occurs, for instance, if the thread blocks on a synchronization variable or waits for some input as is commonly understood in the art. These events are deterministic on a uniprocessor because a thread always blocks or waits for input after the same number of instruction in each run, and therefore the deterministic nature of the scheduling is preserved.

The scheduling mechanism in association with the multicast protocol is used to ensure identical executions of all server replicas. To realize this property, it is necessary that the scheduling mechanism order the thread in a manner consistent with the order defined by the multicast protocol. If such consistency is realized, the threads will be all scheduled according to the same order that was defined by the multicast protocol.

To enable the aforementioned features, associated with this scheduling mechanism is an admission control window (ACW) 40 which represents the method for permitting new threads created when new client requests arrive to be placed in the scheduler's ready queue. ACW 40 has a predetermined value m which controls it's opening and closing. The value m decrements by one each time an instruction slice expires. After m instruction slices have expired, the server waits for a new multicast round. When a new round is available, a thread is created for each request available in that round, and the new threads are admitted into the ready queue 30. From then on, the deterministic scheduler ensures that the executions of the server replicas are identical.

Those who are skilled in the art will realize two features of this invention that radically depart from prior art.

First, the role of the multicast protocol here is not to enforce a certain semantic order on the execution of the client requests. Instead, the multicast protocol serves to define an identical initial order for the admission of requests into the server. In prior art, the order specified by the multicast protocol was binding in that the outcome of the concurrent execution should be identical to a serialization of requests according to the multicast order. This invention takes the view that what necessary is an identical order among all server replicas, even if this order is not identical to a particular sequential order. Some skilled in the art have observed that serialization is not necessary [see Cheriton and Skeen, Proceedings of the ACM Symposium on Operating Systems Principles, 1993], and this invention adopts the same view.

Second, the server couples the scheduling decisions with the order that is defined by the multicast protocols. In the prior art, scheduling and request delivery were always independent.

The selection of m thus controls how responsive the system can be to external events and client requests, while avoiding the utilization of timers that introduce non-determinism. The selection of m also must be coupled with the occurrences of multicast rounds. In particular, there is a one-to-one correspondence between a multicast round and an ACW. It should be appreciated by those skilled in the art that it is relatively straightforward in a particular implementation to tune the value of m to coincide with the frequency of occurrences of multicast rounds.

The frequency of occurrences of multicast rounds is adjustable. If there are no client requests available, a multicast round is nevertheless generated containing no requests. These empty rounds serve to synchronize the replicas by ensuring that all of them go through the same ACW's. These rounds also could be used for failure detection, as done in prior art.

A thread could block waiting for a local system service to complete (e.g. reading a file). When such blocking occurs, the thread relinquishes its instruction slice and is no longer part of the scheduler's ready queue 30. When the reason for blocking is no longer valid (e.g. a file read has completed), the readmission of the thread into the ready queue must be coordinated among the server replicas to ensure consistency. This is done as follows. When a thread is ready to resume execution at one replica, the latter announces this fact in the next multicast round (it appears in the round in addition to client requests). At some future rounds, all replicas will reach the point where that particular thread is ready to run everywhere. At that round, the thread is re-inserted again into the run queue.

Figure 4:
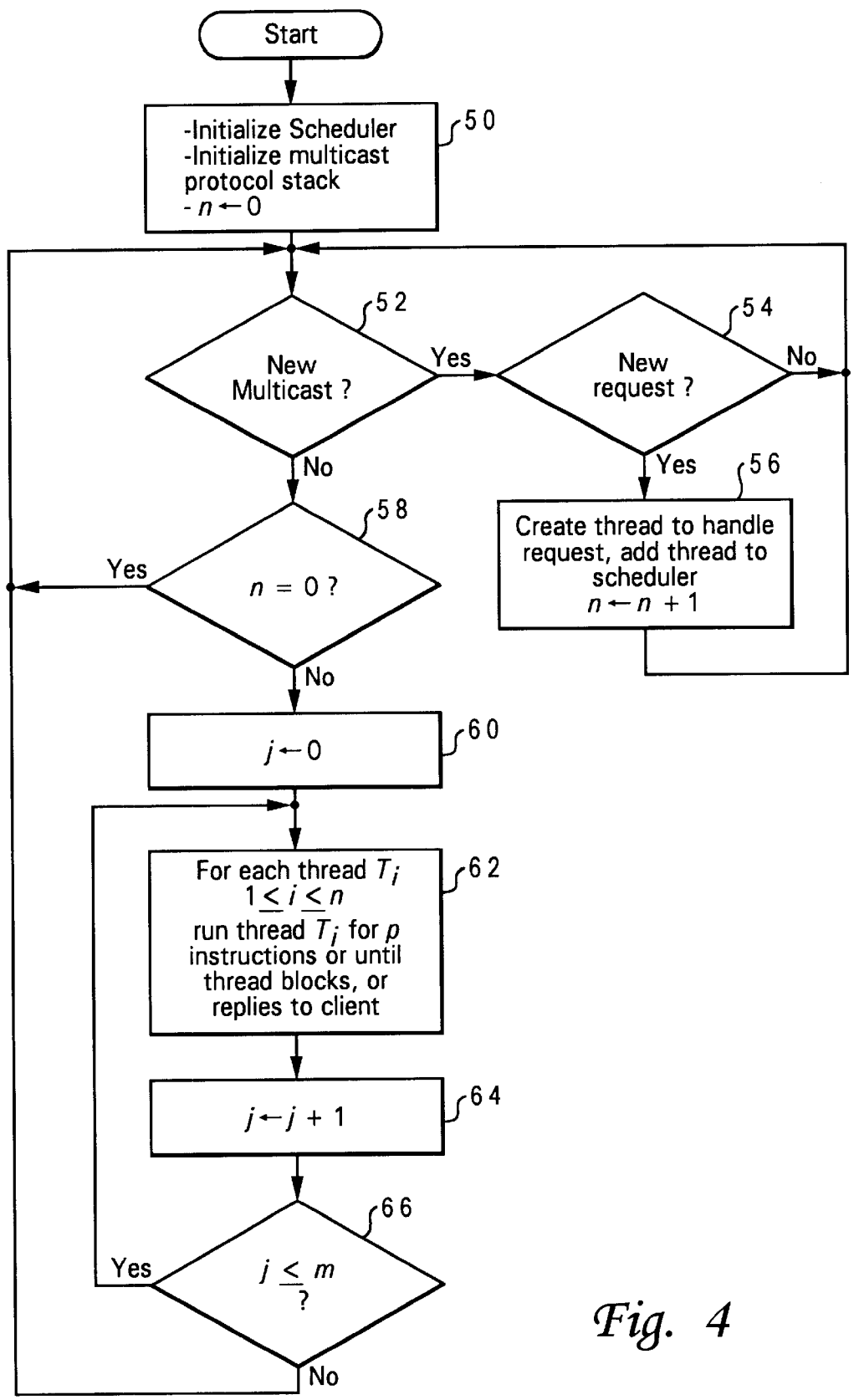
FIG. 4 is a flow chart depicting the logic flow of the method of ordered multicast in association with scheduling threads utilizing instruction slices in accordance with one implementation of the present invention.

The working of scheduler 31 and ACW 40 may be further understood with reference to FIG. 4. Following the logic flow of this embodiment, the processing of a thread scheduler is shown. Once the process starts, the scheduler 31 and multicast protocol stack is initialized at Block 50 and the counter variable n is set to zero. The n variable counts the number of active client requests currently executing in the server. The scheduler 31 then determines if a new multicast round is available in block 52. If so, the scheduler 31 admits new requests at Block 54. If a new request is available the n variable is incremented by one, which creates a thread to handle the request, adds a thread to the scheduler 31, and returns to Block 52. This process continues until no additional new multicast requests are available. The scheduler then checks at Block 58 to make sure that there are requests to be run. If there are threads in the queue, the scheduler then begins to execute each thread in slices in Block 62 beginning with the first thread. An ACW counter variable j is set to zero at this time at Block 60. The threads are made to execute p instructions (or one slice) or until the thread blocks or replies to the client in Block 62. After each slice is executed, the ACW counter variable is incremented by one Block 64. A check is made to determine if this counter variable has reached a predefined number m that determines when a new multicast round should be checked. The thread slices continue until this number has been reached. As shown in Block 66, when the ACW counter variable becomes larger than m, then the ACW opens and a new round of multicast is accepted as in Block 52. The entire scheduling process continues indefinitely.

The above combination of thread scheduling and multicast delivery ensures that server replicas 84, 86 and 88 execute clients' requests in an identical manner. By way of example, but not of limitation, consider the execution of a multithreaded program as a stream of instructions. New requests are admitted into the stream of instructions every m instruction slices. Since all replicas receive the multicast at the same point within the instruction stream, and since the multicast protocol ensures ordered and reliable delivery everywhere, then new requests are admitted at the same point within the instruction stream at all replicas. The corresponding thread thus starts at the same execution point within the instruction stream, and the thread scheduler at any replica ensures that it is scheduled in an identical manner. The interleaving of thread execution is also identical at all replicas through the use of deterministic thread scheduling.

It is also important to note that although the present invention has been described in the context of a fully functional remote method invocation system, those skilled in the art will appreciate that the mechanisms of the present invention are capable of being distributed as a program product in a variety of forms to any type of information handling system, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

It should be noted that the CORBA standard currently does not support active replication to ensure automatic fail-over for high availability. The problem is difficult because CORBA objects are multithreaded and cannot produce identical executions when replicated. The present invention herein described offers a solution to this problem that enables active replication to be used in the context of a CORBA compliant system, resulting in the same high-availability that could be provided by traditional systems. Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, although FIG. 4 illustrates the ACW as having a separate counter, it is possible to share a counter with the scheduler whereby the ACW opens after all the scheduled threads have been executed once. It is therefore contemplated that such modifications can be made without departing from the spirit or scope of the present invention as defined in the appended claims.

What is claimed is:

1. A method for replication support in a remote method invocation system, said method comprising:

a plurality of clients communicating with a replicated server through remote procedure calls;

ordering and grouping clients' remote procedure calls via an ordered multicast protocol;

delivering said remote procedure calls reliably to all server replicas and in an identical same order;

creating threads at each server replica to carry out clients' requests in an order conforming with an order specified by said multicast protocol; and scheduling said threads in conformance with said order in a deterministic and preemptive manner by allocating instruction slices with respect to said client requests at all said server replicas.

2. The method for replication according to claim 1, further comprising:

grouping and ordering said client requests in multicast rounds;

specifying an order in which said client requests within said multicast round should be executed; and delivering the multicast rounds to said server replicas reliably in said order.

3. The method for replication according to claim 1, further comprising:

specifying a number of instructions p included in said instruction slice;

utilizing an instruction counter that decrements by one for each executed instruction;

setting said instruction counter at the beginning of each instruction slice to p;

scheduling a thread at the beginning of each said instruction slice;

generating an interrupt when said counter reaches a value of zero; and using said interrupt to enable scheduling of a new thread at a beginning of a new instruction slice.

4. The method for replication according to claim 3, further comprising the steps of:

placing said threads in a scheduling queue according to an order specified by said multicast protocols.

5. The method for replication according to claim 3, wherein a given thread executes said instruction slice until it executes p instructions or voluntarily blocks.

6. The method for replication according to claim 3, wherein a given thread that blocks is not readmitted into a run queue until all replicas agree at which said multicast round it should be admitted.

7. The method for replication according to claim 3, wherein said server replicas propagate information about the readiness of blocked threads via said multicast protocol rounds.

8. The method for replication according to claim 4, where admission of new requests delivered during said multicast round is checked after an execution of a particular number of said instruction slices.

9. The method for replication according to claim 4, where said multicast round is synchronized with a thread scheduler's admission of new client requests through a usage of a numeric constant to determine a number of said instruction slices between every two said multicast round deliveries.

10. The method for replication according to claim 8, comprising:

admitting new client requests to a server after a number of instruction slices equal to said numeric constant have been executed;

admitting said client requests in an order specified by said multicast protocol;

disallowing an admission of any new client request except during a delivery of said multicast rounds;

tracking a numeric constant number of said instruction slices between every two consecutive multicast rounds; and stopping an execution of a server each time a of instruction slices between any two consecutive multicasts have executed; and generating empty multicast rounds to ensure progress, failure detection and replica synchronization.

11. The method for replication according to claim 1 wherein the initial thread scheduling is determined by an order specified by said multicast protocol.

12. An information handling system, comprising:

means for communicating a plurality of clients with a replicated server through remote procedure calls;

means for ordering and grouping clients' remote procedure calls via an ordered multicast protocol;

means for delivering said remote procedure calls reliably to all server replicas and in an identical same order;

means for creating threads at each server replica to carry out clients' requests in an order conforming with an order specified by said multicast protocol; and means for scheduling said threads in conformance with said order in a deterministic and preemptive manner by allocating instruction slices with respect to said client requests at all said server replicas.

13. An information handling system according to claim 12, further comprising:

means for grouping and ordering said client requests in multicast rounds;

means for specifying an order in which said client requests within said multicast round should be executed; and means for delivering the multicast rounds to said server replicas reliably in said order.

14. An information handling system according to claim 13, further comprising:

means for specifying a number of instructions p included in said instruction slice;

means for utilizing an instruction counter that decrements by one for each executed instruction;

means for setting said instruction counter at the beginning of each instruction slice to p;

means for scheduling a thread at the beginning of each said instruction slice;

means for generating an interrupt when said counter reaches a value of zero; and means for using said interrupt to enable scheduling of a new thread at a beginning of a new instruction slice.

15. An information handling system according to claim 14, further comprising:

means for placing said threads in a scheduling queue according to an order specified by said multicast protocols.

16. An information handling system according to claim 1, further comprising:

means for a given thread executes said instruction slice until it executes p instructions or voluntarily blocks.

17. An information handling system according to claim 16, further comprising:

means for said given thread that blocks is not readmitted into a run queue until all replicas agree at which said multicast round it should be admitted.

18. An information handling system according to claim 17, further comprising:

means for said server replicas to propagate information about the readiness of blocked threads via said multicast protocol rounds.

19. An information handling system according to claim 18, further comprising:

means for admission of new requests delivered during said multicast round is checked after an execution of a particular number of said instruction slices.

20. A computer program product, comprising:

instruction means for communicating a plurality of clients with a replicated server through remote procedure calls;

instruction means for ordering and grouping clients' remote procedure calls via an ordered multicast protocol;

instruction means for delivering said remote procedure calls reliably to all server replicas and in an identical same order;

instruction means for creating threads at each server replica to carry out clients' requests in an order conforming with an order specified by said multicast protocol; and instruction means for scheduling said threads in conformance with said order in a deterministic and preemptive manner by allocating instruction slices with respect to said client requests at all said server replicas.

* * * * *